United States Patent [19]

Gans

[11] 4,216,964
[45] Aug. 12, 1980

[54] PUZZLE GAME

[76] Inventor: Ernest A. Gans, 84-39 153rd Ave., Howard Beach, N.Y. 11414

[21] Appl. No.: 6,547

[22] Filed: Jan. 26, 1979

Related U.S. Application Data

[63] Continuation-in-part of Ser. No. 752,407, Dec. 20, 1976, Pat. No. 4,138,115.

[51] Int. Cl.$^3$ .............................................. A63F 9/06
[52] U.S. Cl. ................................ 273/153 R; 273/156; 273/282; 273/288
[58] Field of Search ............... 273/240, 282, 283, 288, 273/153 R, 156; 35/48 A

[56] References Cited

U.S. PATENT DOCUMENTS

| | | | |
|---|---|---|---|
| 227,931 | 5/1880 | Totten | 273/240 |
| 300,534 | 6/1884 | Van Bibber | 273/283 X |
| 1,251,822 | 1/1918 | Prendergast . | |
| 1,892,318 | 12/1932 | Pressey | 35/48 A |
| 1,959,040 | 5/1934 | Schilling | 273/153 R |
| 2,052,848 | 9/1936 | Schilling | 273/153 S |
| 2,170,909 | 8/1939 | Moren . | |
| 3,178,185 | 4/1965 | Ardis | 273/288 X |
| 3,189,350 | 6/1965 | Hopkins . | |
| 3,603,591 | 9/1971 | Shoptaugh | 273/282 X |
| 3,618,951 | 11/1971 | Parrick | 273/240 |
| 3,895,804 | 7/1975 | Lee | 273/282 X |
| 4,018,445 | 4/1977 | Anania | 273/282 X |

Primary Examiner—Anton O. Oechsle
Attorney, Agent, or Firm—Leonard W. Suroff

[57] ABSTRACT

A number problem game which comprises a playing board having a planar surface thereon, with an odd number of squares arranged in an equal number of horizontal and vertical rows intersecting each other on the playing board, as well as a plurality of playing elements with each element having a different numbered indicia thereon. The elements being arrangeable on the squares of the board to satisfy a predetermined value which is satisfied by the arithmetical equation:

$$\frac{\sqrt{n}\,(a + N)}{2} = X$$

such that when the plurality of elements are properly positioned on the squares, the sum of the numbered indicia on the elements on each of the horizontal and vertical rows is equal to X, and a plurality of borders on the playing board in surrounding relationship to respective groups of odd numbers of the squares are provided. Each one of the borders having indicium thereon equivalent to one of the predetermined values of X. The sum of the numbered indicia on each of the elements positioned on the diagonal rows formed by the squares is also equal to the sum specified by X in each of the respective groups.

20 Claims, 7 Drawing Figures

PUZZLE GAME

RELATED APPLICATION

This application is a continuation-in-part of applicant's co-pending patent application Ser. No. 752,407, filed Dec. 20, 1976 now U.S. Pat. No. 4,138,115, issued Feb. 6, 1979.

BACKGROUND OF THE INVENTION

1. Field of the Invention

The present invention relates to a unique and novel game of numbers, wherein elements having numbered indicia thereon have to be arranged in a proper arrangement in order to solve the mathematical puzzle or problem that the game provides on a game board.

2. Description of the Prior Art

There has been proposed in the prior art number games in which particular solutions were required to assemble loose pieces in columns, rows, and diagonals, such that the sum of the numerals of each will equal the same amount. One such example of a game is illustrated in U.S. Pat. No. 2,170,909. I have discovered that it is possible by determination of a specific formula to provide a number game that provides for puzzles on a single playing board, or jig saw puzzle arrangement, that may have differing degrees of difficulty, depending upon the age and capability of the player.

The distinctions of my game and the problems created thereby present problems of varying degree, not capable of obtainment with the above referenced prior art patent. The advantages and distinctions of my invention over the prior art will become more clearly evident as the disclosure proceeds.

OBJECTS OF THE INVENTION

An object of the present invention is to provide a number problem game in which the playing board may contain more than one group of problems that have to be solved to win the game.

Another object of the present invention is to provide a number problem game that has solutions thereto, by placing thereon playing elements having different sequentially numbered indicia, that may be magnetically attracted to the game board.

Another object of the present invention is to provide a number problem game on which the playing board may contain two or more different mathematical problems extending in concentric relationship to each other.

Another object of the present invention is to provide a mathematical numerical game in the form for the player to provide his or her own solution that is educational and challenging.

Another object of the present invention is to provide a numerical game that is interesting to play and aids in teaching one rapid addition.

Other objects and advantages of the present invention will become apparent as the disclosure proceeds.

SUMMARY OF THE INVENTION

A number problem game which comprises a playing board having a planar surface thereon, with an odd number of squares arranged in an equal number of horizontal and vertical rows intersecting each other on the playing board, as well as a plurality of playing elements with each element having different consecutively numbered indicia thereon. The elements being arrangeable on the squares of the board to satisfy a predetermined value which is satisfied by the arithmetical equation:

$$\frac{\sqrt{n}\,(a + N)}{2} = X$$

such that when the plurality of elements are properly positioned on the squares, the sum of the numbered indicia on the elements on each of the horizontal and vertical rows is equal to X, and a plurality of borders on the playing board in surrounding relationship to respective groups of odd numbers of the squares are provided. Each one of the borders having indicium thereon equivalent to one of the predetermined values of X. The sum of the numbered indicia on each of the elements positioned on the diagonal rows formed by the squares is also equal to the sum specified by X in each of the respective groups.

Retaining means may be provided between the playing board and each of the elements, one such form is fabricated from materials such that they may be magnetically attracted to each other. The plurality of multi-sided playing elements may be provided with a coding such that the playing elements may be divided into respective sets, with each of the sets being of a select number of elements for use in a particular solution of the game with one of the groups. The coding being such as to divide each of the sets of the elements such that they are readily distinguishable from each other.

The number problem game may also contain solution means adapted to be operatively positioned on the playing board for each of the respective groups, such that a player may quickly determine if the proper solution to the number game has been obtained.

The game may also be provided in the form whereby the player can provide his own set of numbers to satisfy his own solution arrived at by use of, or in conformity with, the mathematical formula.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
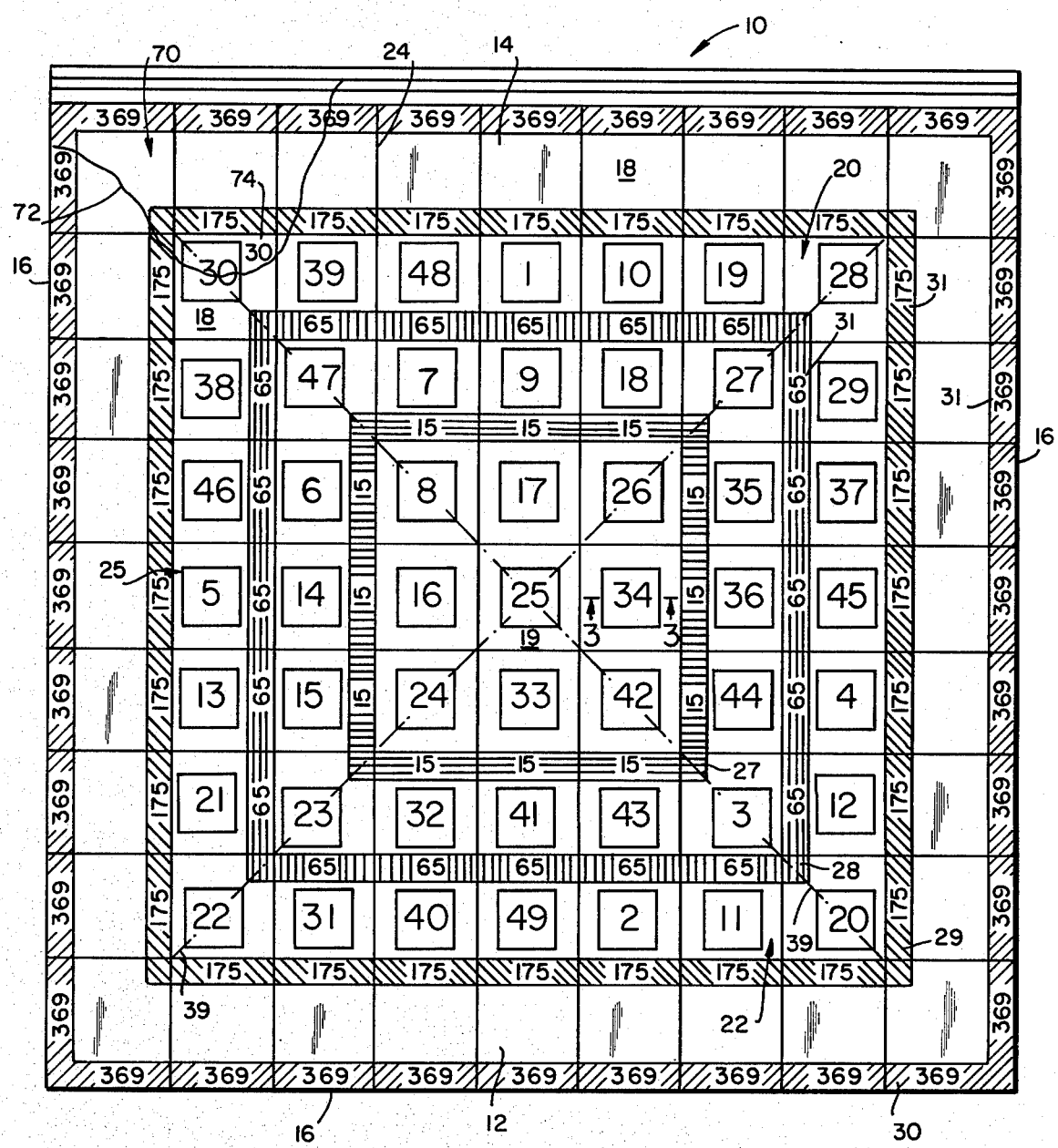
FIG. 1 is a top planar view of a playing board of a game of numbers in accordance with the present invention.

Referring to the drawings, there is illustrated in FIGS. 1 through 7 a number problem game 10 which, comprises a playing board 12 having a planar surface 14 thereon with respective sides or ends 16. The board 12 may be square and fabricated from a magnetic material in whole or in part in accordance with one embodiment of the invention. An odd number of squares 18, having a central square 19, are arranged in an equal number of horizontal rows and vertical rows 22, which intersect each other on the playing board 12. Dividing lines 24 may be provided between the respective squares 18.

A plurality of playing elements 25 are provided with each element having a different sequentially numbered indicia 26 thereon. The numbering of the indicia 26 may be consecutive or in a sequence other than consecutive that is of an equal interval. The elements 25 being arrangeable on the squares 18 of the board 12 to satisfy a predetermined value which is satisfied by the arithmetical formula:

$$\frac{\sqrt{n}\,(a+N)}{2} = X \qquad (1):$$

wherein:
- $a$ = first numbered indicia of a series
- $N$ = last numbered indicia of a series
- $n$ = total number of elements in a series
- $\sqrt{n}$ = being an integer, and the interval in the series is a constant.

In this manner when the plurality of elements 25 are properly positioned on the squares 18, the sum of the numbered indicia on the elements 25 on each of the horizontal rows 20 and vertical rows 22 is equal to the number X. In addition, a plurality of borders 27, 28, 29 and 30 are provided on the playing board 12 in surrounding relationship to respective groups of odd numbers of the squares 18. Each one of the borders 27 through 30 having indicium 31 thereon equivalent to one of the predetermined values of X. The variety of the number X may vary in accordance with formula (1).

In addition, the sum of the numbered indicia on each of the elements 25 positioned on the diagonal rows 39 formed through central square 19, and the squares 18, is also equal to the sum specified by X. The solutions to formula (1) may be satisfied with the predetermined value of X on one of the borders 29 being 175. For this solution by which the equation or formula is satisfied there are provided 49 of the consecutively numbered elements numbered from 1 through 49, inclusive. Further, when the odd number of squares is 49, then they are divided into 7 of the horizontal rows and 7 of the vertical rows.

FIG. 1 has been illustrated with one solution to one problem of the game. The indicium 31 on the borders 27 through 30, inclusive, may include the numbers 15, 65, 175, and 369, respectively, or such other value as may satisfy the formula. In this arrangement each particular group of odd squares 18 defined by one of the borders 27 through 30 will require a different number of consecutively numbered elements 25. Towards this end there may be provided a plurality of playing elements 25 which are divided into respective sets by means of a coding 35 on a plurality of the surfaces or sides 36 thereof.

Figure 4:
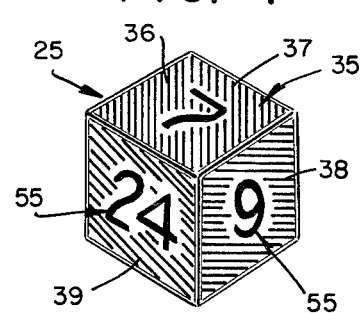

The coding 35 permits a single group of playing elements 25 to be used to solve a number of problems in the game 10. For example, the multi-sided element 25 may include color or other indicia to form respective sets. FIG. 4 illustrates the element 25 having a surface that may be coded red and identified by numeral 37, a surface that is blue and identified by the numeral 38, and a surface that is green and identified by the numeral 39.

Figure 5:
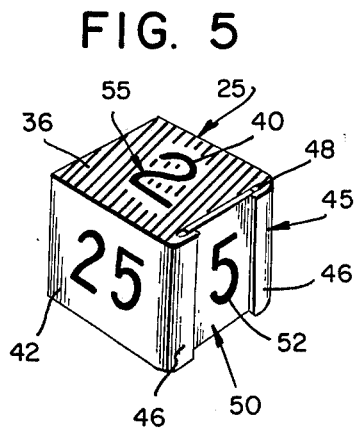
FIGS. 4 and 5 illustrate a perspective view of differing numbered playing elements that may be provided in accordance with the present invention.

FIG. 5 is a view which may be of the same playing element 25 and illustrates three additional surfaces 36 thereon. One surface may be coded brown and identified by the numeral 40. Another surface 42 may be in the form of a blackboard in which a numeral may be placed thereon by chalk or some other writing instrument. A blank surface is provided to permit the user of the game to possibly select his or her own set of numbers for a solution based upon the teachings of the invention. In this manner if a novel or new set of numerals is selected that will fit a solution that is given to the game, then the user may individually mark the elements 25 to obtain the desired end result. In this manner the player can create his or her own set of numbers and solution based on the formula disclosed.

Alternately, the element 25 may be formed with gripping means 45 formed to include a pair of arms 46 defining a sleeve or groove 48. The groove 48 is adapted to receive a card-like member 50 which may have thereon a numeral 52.

The gripping means 45 permits the player of the game to either write on each member 50, or a plurality of members 50 may be provided with numerals 52 thereon. This may be the case if from time to time different number combinations are formulated or the game rules are slightly altered and existing users or owners of the game 10 wish to purchase a combination of members 50 to provide a new solution. In the manner as described in FIGS. 4 and 5, each element 25 permits the user a greater flexibility in playing the game 10.

As illustrated in FIG. 1, there is disclosed an arrangement in which four examples are provided. The element 25 in FIGS. 4 and 5 has four surfaces, namely 37, 38, 39 and 40, which may have directly thereon indicia 55. The indicia 55 being in the form of a number which leads, when properly positioned on the playing board 12, to the solution of the game 10. The present invention permits, by means of the coding 35, to divide the elements 25 into respective sets. The sets are thereafter used depending upon which solution of those illustrated in FIG. 1, is to be solved.

In this manner the borders 27 through 30, inclusive, may be color coded in the same format as the coding 35 described above. In this manner if one were to solve the game illustrated on border 27, then perhaps all the elements would be used with the surface 37 being exposed. For border 31 the elements 25 may be put into the sets with the surface 38 being exposed, with respect to border 29, the surface 39 may be exposed, and with respect to border 30, the surface 40 may be exposed.

Figure 3:
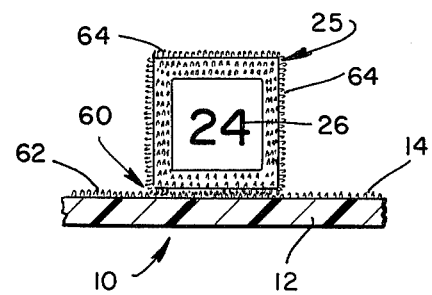
FIG. 3 is a sectional view taken along lines 3—3 of FIG. 1.

The assemblage of the elements 25 with the planar surface 14 may take various combinations, one of which is illustrated in FIG. 3, and includes retaining or interlocking means 60. The purpose of the interlocking means is to permit ready assembly and disassembly of each element 25 from the board 12. The playing surface 14 may be fabricated from a plastic interlocking surface 62. The elements 25 on each of the plurality of sides 36 may have a complementary interlocking surface 64 such as is well known in the art and commonly known as Velcro.

As illustrated in FIG. 1, the first solution would include 9 elements, which may be numbered 1 through 9. The elements 25 may be square in shape. As illustrated in FIG. 1, another solution would include 25 elements, which may be numbered 1 through 25. Border 27 defines a total of 9 squares, border 28 defines a total of 25 squares, border 29 defines a total of 49 squares, and border 30 defines a total of 81 squares.

The manner in which the predetermined value of X is arrived at, as determined for the above illustrated examples, is given by the solution to formula (1) as set forth in (2) through (5) given below.

$$\frac{\sqrt{9}\,(1+9)}{2} = 15 \qquad (2)$$

$$\frac{\sqrt{25}\,(1+25)}{2} = 65 \qquad (3)$$

$$\frac{\sqrt{49}\,(1+49)}{2} = 175 \qquad (4)$$

$$\frac{\sqrt{81}\,(1+81)}{2} = 369 \qquad (5)$$

The above illustrate certain of a great variety of arrangements for the game puzzle 10 of the present invention. By providing different sets of elements 25, a player may select which puzzle, in the group of four illustrated, he or she may wish to attempt to solve. In this manner, depending upon the age and intelligence of the player, the respective sets 35 through 38 may be selected. In addition, when the solution is obtained, the diagonal rows 39 illustrated by the broken lines on FIG. 1 also add up to the particular number in the respective border. FIG. 1 has been illustrated with the solution to one game illustrated in formula (4) above.

The game 10 further includes solution means 70 adapted to be operatively positioned on the playing board 12 for each of the respective groups, such that a player may quickly determine if the proper solution to the number game 10 has been obtained. The solution means 70 includes a sheet 72 having positioned thereon the correct numerals 74 for the group of the game selected. The solution means 70 may take various forms.

The numerals 74 extend in overlapping relationship to a respective one of the squares 18. Securement means 75 is provided for the sheet 72 and is adapted to be removably secured to the playing board 12 along substantially one end 16 thereof. The playing board 12 has an elongated groove 76 extending along one edge 16 thereof, and the sheet 72 has a protrusion 78 extending outwardly from one end 80 thereof and adapted to be releasably positioned in frictional engagement with the groove 76. The solution means 70 is generally for one solution, since as many as eight solutions may be obtainable for a puzzle arrangement.

A set of solution means 70 may be provided, such that one may be used with each particular problem of the game. In this manner the player may check his or her accuracy as to the obtainment of the solution to the game rather than having to add up each row individually.

Although there has been illustrated four mathematical problems on the playing board 12, less than, or more than, that number may be provided.

Accordingly, the playing board 12 has a group of borders 27, 28, 29, and 30 that extend outwardly from the center of the surface 14 in concentric relation to each other. Each border may have a square shape with the corresponding indicium 31 therein to aid the person solving the puzzles. The indicium 31 is in alignment with each of the rows 20 and 22 and is of a value corresponding to each puzzle, four being illustrated, that may be solved.

One solution is one in which $a=3$, $N=11$, and $n=9$. In this manner the series of numbers are consecutive and include the numerals 3, 4, 5, 6, 7, 8, 9, 10 and 11. The solution to the equation (1) is $$X = \frac{\sqrt{9}\,(3+11)}{2} = \frac{3 \times 14}{2} = \frac{42}{2} = 21. \qquad (6)$$

Accordingly, formula (6) illustrates an example in which the first number is not one and the series is consecutive. The solution of X is the number 21.

Another example of a solution is a different number for X, which is 33. In this example $N=19$ and $a=3$. The series is 3, 5, 7, 9, 11, 13, 15, 17 and 19. In this example the numbers are not consecutive in that the series is of a constant interval with a skipping between numerals. To state otherwise, every other number in the series is utilized.

The equation for the puzzle 10 may be selected such that $a=15$ and $N=39$. This shows the flexibility of the equation in that $X=135$. The series contains 25 consecutive numbers of 15, 16, 17 . . . 37, 38 and 39. In this manner the first and last numbered indicia of the series may be selected to vary the degree of challenge of the game. A variety of numbers may be selected provided that n is an integer having a square root that is a whole number.

Figure 6:
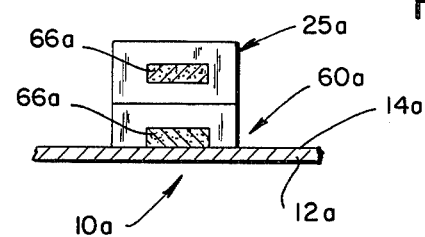
FIGS. 6 and 7 are side views illustrating alternate retaining means between the playing board and the playing elements.

FIG. 6 includes an alternate embodiment of the interlocking means 60a of the game 10a by which each element 25a is coupled to the planar surface 14a by the use of interlocking or retaining means 60a that is of a magnetic nature. Each element 25a may include a magnetic metellic member 66a and the game board 12a may have the planar surface 14a formed of or coated with a metallic material that has a magnetic attraction. In this way each of the elements 25a is fabricated such that they are magnetically attracted to the game board 12a.

Figure 7:
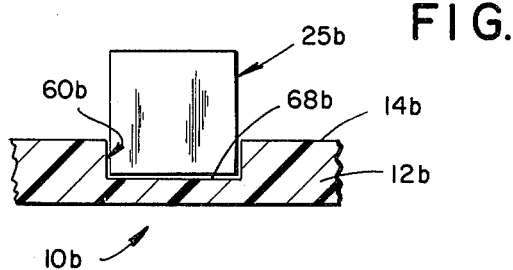
Figure 2:
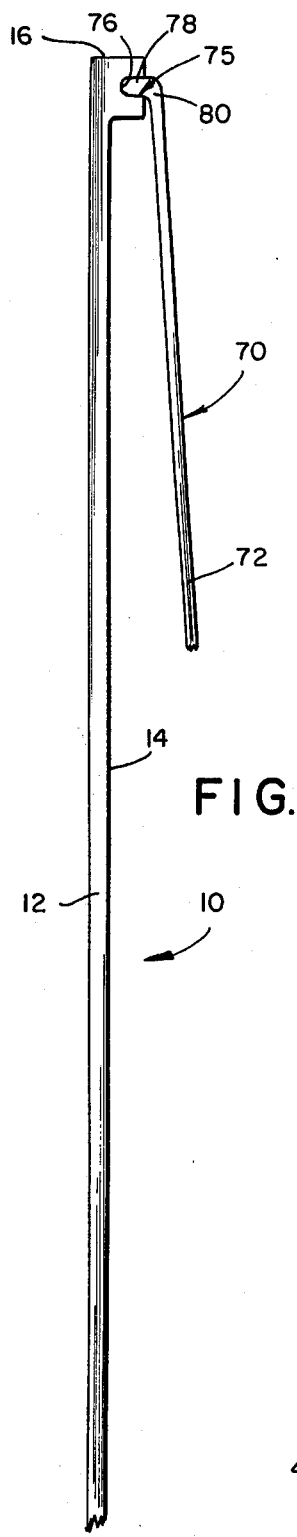
FIG. 2 illustrates a side view of the playing board of FIG. 1.

FIG. 7 illustrates an alternate embodiment of the game 10b where the retaining means 60b includes a well or seat 68b in each of the squares illustrated in FIG. 1. In this manner each element 25b is adapted to be received in each well 68b with a minimum, if any, of resistance. This is always ideal since game boards have a tendency to shift position for various reasons and the retaining means 60b prevents the elements 25b from becoming upset or moving.

Although illustrative embodiments of the invention have been described in detail herein with reference to the accompanying drawings, it is to be understood that the invention is not limited to the precise embodiments and that various changes and modifications may be effected therein without departing from the scope or spirit of the invention.

I claim:
1. A number problem game, which comprises:
   A. a playing board having a planar surface thereon,
   B. an odd number of squares arranged in an equal number of horizontal and vertical rows intersecting each other on said playing board,
   C. a plurality of multi-sided playing elements with each element having different sequentially numbered indicia thereon, said elements being arrangeable on said squares of said board to satisfy a predetermined value which is satisfied by the arithmetical equation:

$$X = \frac{\sqrt{n}\,(a + N)}{2}$$

wherein:
- a = first numbered indicia of a series
- N = last numbered indicia of a series
- n = total number of elements in a series
- $\sqrt{n}$ = being an integer, and the interval in the series is a constant such that when said plurality of elements are properly positioned on said squares, the sum of the numbered indicia on said elements on each of said horizontal and vertical rows is equal to X, D. a coding provided on a plurality of the respective sides of said multi-sided playing elements in conjunction with said numbered indicia such that said elements may be divided into respective sets, wherein each one of said sets being of a select number of said elements for use in the solution of one problem of the game, E. at least one border on said playing board in surrounding relationship to respective groups of odd numbers of said squares, said border having indicium thereon equivalent to one of said predetermined values of X F. retaining means for releasably securing each one of said individual elements in interlocking relationship to said playing board on each one of said squares, G. solution means adapted to be operatively positioned on said playing board for each of said respective groups, such that a player may quickly determine if the proper solution to the number game has been obtained, H. said solution means including a sheet having positioned thereon the correct numerals for the group of the game selected, said numerals each extending in overlapping relationship to a respective one of said squares, I. coupling means for removably securing said sheet to said playing board along substantially one end thereof, and J. said coupling means includes:
  (1) an elongated groove extending along one edge of said playing board, and
  (2) a protrusion extending outwardly from one end of said sheet and adapted to be releasably positioned in frictional engagement with said groove.

2. A number problem game as in claim 1, wherein the sum of the numbered indicia on each of said elements positioned on the diagonal rows formed by said squares is also equal to the sum specified by X.

3. A number problem game as in claim 1, wherein said indicium of each of said groups is positioned in substantial alignment with each of said rows.

4. A number problem game as in claim 1, wherein said retaining means includes on each one of said elements a magnetically attracted member so as to obtain a removable coupling relationship with said playing board.

5. A number problem game as in claim 1, wherein said retaining means includes a well in each of said squares adapted to receive one of said playing elements therein.

6. A number problem game as in claim 1, wherein said retaining means includes:
  a. said planar surface fabricated from a plastic interlocking surface, and
  b. said elements are provided on a plurality of the respective sides of said multi-sided surface with a complementary interlocking surface.

7. A number problem game as in claim 1, wherein said coding to form said sets of said elements are readily distinguishable from each other by color.

8. A number problem game as in claim 1, wherein said equation is satisfied by providing 49 of said numbered elements.

9. A number problem game as in claim 8, wherein said predetermined value of X on at least one said border is 175 and includes said elements numbered 1 through 49 inclusive.

10. A number problem game as in claim 1, wherein at least one said border is divided into 49 squares that are divided into 7 of said horizontal rows and 7 of said vertical rows.

11. A number problem game as in claim 1, wherein said predetermined value of X on one of said borders is 15.

12. A number problem game as in claim 1, wherein said equation is satisfied by providing 9 of said numbered elements.

13. A number problem game as in claim 12, wherein at least one said border is divided into 9 squares that are divided into 3 of said horizontal rows and 3 of said vertical rows.

14. A number problem game as in claim 1, wherein said equation is satisfied by providing 25 of said numbered elements.

15. A number problem game as in claim 1, wherein said equation is satisfied by providing 81 of said numbered elements.

16. A number problem game as in claim 1, wherein said numbered indicia on said elements are consecutively numbered with respect to said coding on each one of said sets.

17. A number problem game as in claim 1, wherein said numbered indicia on said elements follow in an interval separated by an equal numeric value.

18. A number problem game as in claim 1, wherein four of said borders on said planar surface are provided, each of said borders being square in configuration and extending in concentric relationship to each other.

19. A number problem game as in claim 1, including gripping means on one of the respective sides of said playing elements, and having a pair of arms defining a sleeve to receive a card-like member which may contain a numeral thereon.

20. A number problem game as in claim 1, wherein one of the respective sides of said playing elements is in the form of a blackboard.

* * * * *